United States Patent [19]

Pitts et al.

[11] 4,413,618
[45] Nov. 8, 1983

[54] SOLAR COLLECTOR

[75] Inventors: Elvin C. Pitts, Irvine; Walter G. Burns; Harvey R. Anderson, both of Concord, all of Calif.

[73] Assignees: King Energy Systems, Inc., Irvine; Servamatic Solar Systems, Inc., Concord, both of Calif.

[21] Appl. No.: 318,174

[22] Filed: Nov. 4, 1981

[51] Int. Cl.³ .............................................. F24J 3/02
[52] U.S. Cl. .................................. 126/450; 126/438; 126/443
[58] Field of Search .............. 126/438, 435, 437, 450, 126/443, 432, 442

[56] References Cited

U.S. PATENT DOCUMENTS

| | | | |
|---|---|---|---|
| 735,321 | 8/1903 | Walker | 126/438 |
| 1,880,938 | 10/1932 | Emmet | 126/438 |
| 1,989,999 | 2/1935 | Niederle | 126/438 |
| 3,847,136 | 11/1974 | Salvail | 126/438 |
| 4,011,855 | 3/1977 | Eshelman | 126/438 |
| 4,106,484 | 8/1978 | Dame | 126/438 |
| 4,137,903 | 2/1979 | Annett | 126/443 |
| 4,155,346 | 5/1979 | Aresty | 126/438 |
| 4,347,836 | 9/1982 | Frank | 126/450 |
| 4,351,319 | 9/1982 | Robbins, Jr. | 126/438 |
| 4,355,629 | 10/1982 | Cornell | 126/438 |

FOREIGN PATENT DOCUMENTS 1165672 10/1958 France ............................... 126/438

Primary Examiner—James C. Yeung

[57] ABSTRACT

A solar collector for heating water includes a collector housing having a longitudinal axis. The upper edges of the side walls of the housing define a plane in which the longitudinal axis of the housing lies. A curved concentrating light reflector is mounted in the housing so that the surface of the reflector is substantially symmetrical relative to the longitudinal axis of the housing. The collector assembly includes a collector tube through which water to be heated flows. The collector tube and collector assembly have an axis of symmetry. The inlet to the collector tube causes water flowing into the tube to follow a helical path to improve the rate of transfer of heat to the water within the collector tube. A hollow cylindrical energy conservator tube is spaced around the collector tube by end caps at opposite ends of both the collector tube and conservator tube. The assembly is mounted in the housing so that the longitudinal axis of the collector assembly substantially coincides with the longitudinal axis of the housing. A curved dome made of a material which substantially transparent to solar radiant energy is mounted on the housing to enclose the assembly within the housing.

16 Claims, 8 Drawing Figures

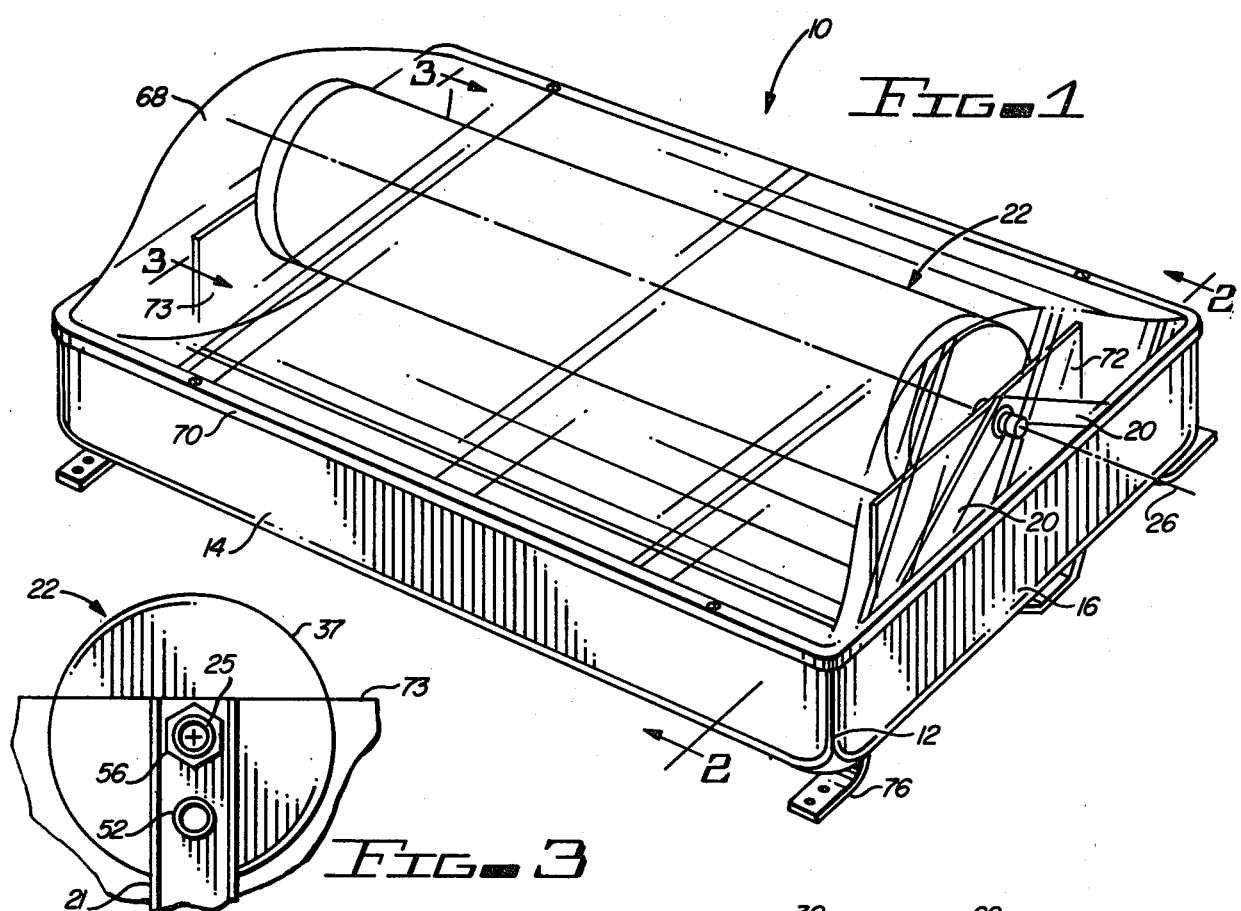
Fig-1
Fig-3
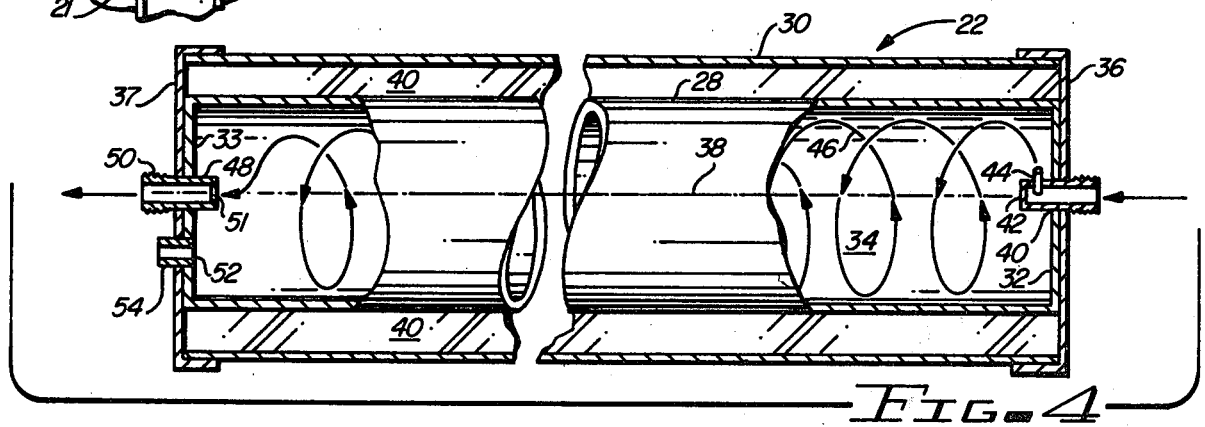
Fig-4
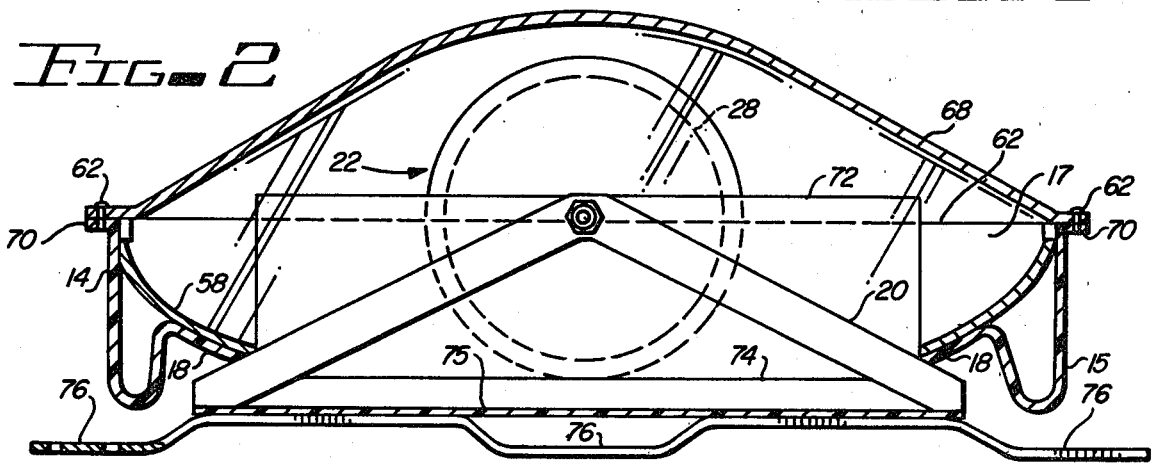
Fig-2

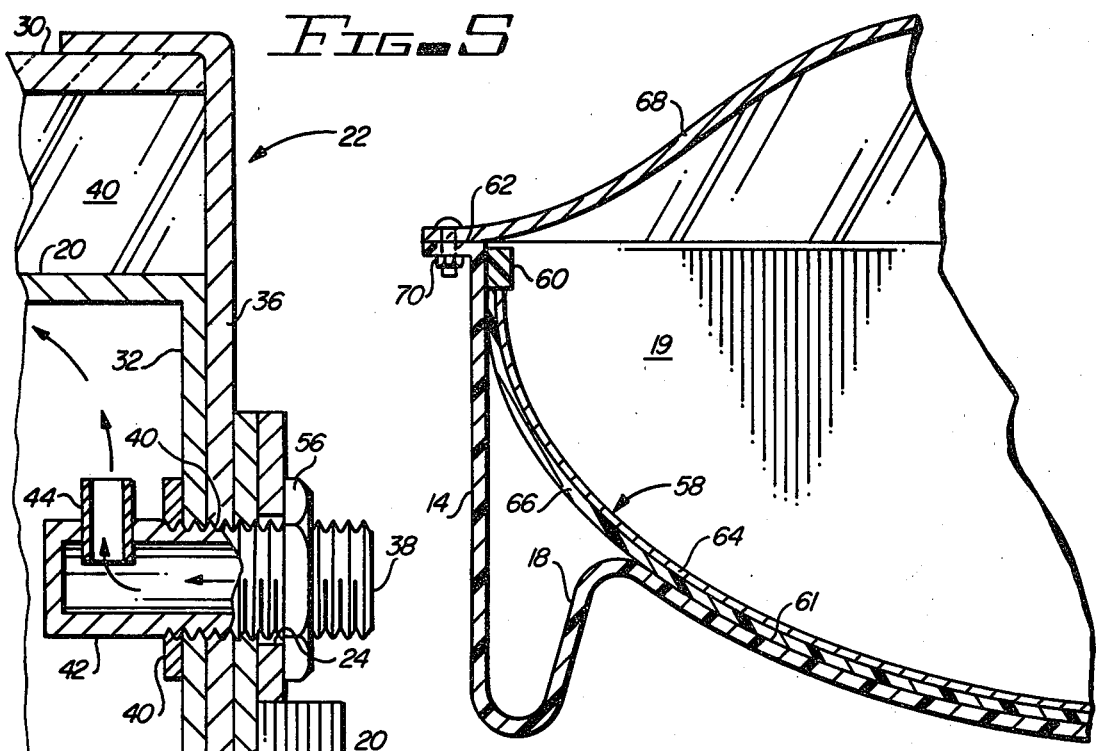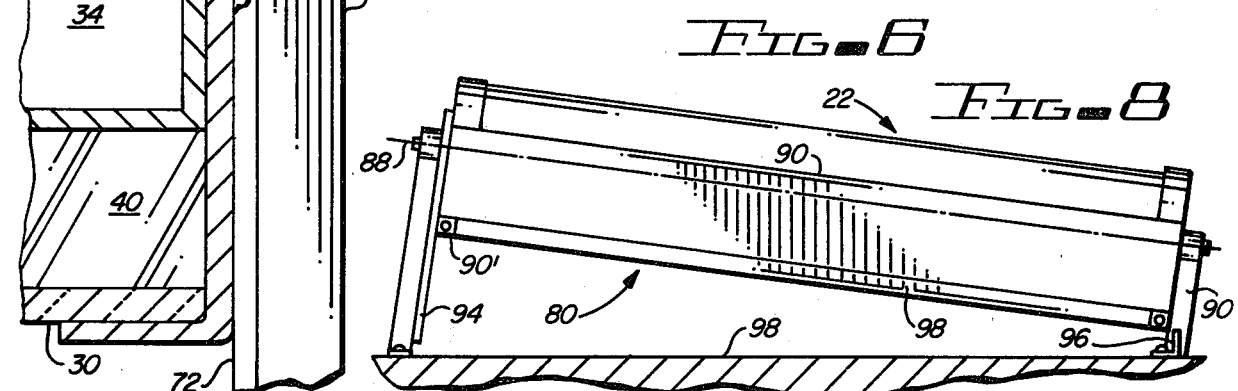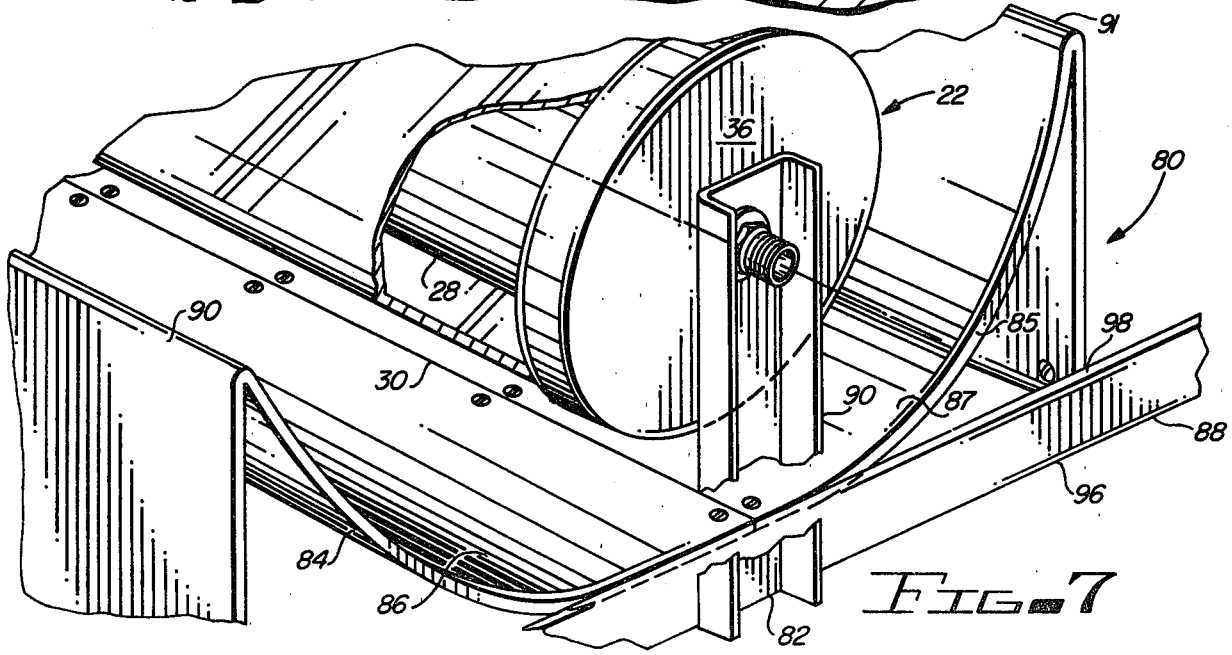

SOLAR COLLECTOR

BACKGROUND OF THE INVENTION

1. Field of the Invention

This invention is in the field of solar liquid heating devices and more particularly relates to passive concentrating solar collectors for heating water for domestic and industrial use.

2. Description of the Prior Art

Solar collectors are broadly divided into active and passive systems. Active systems track the sun from sunrise to sunset while the passive systems do not include a tracking system. Passive systems can be further divided into flat plate and concentrating collectors. In concentrating solar collectors, radiant electromagnetic energy, primarily in the visible spectrum, is reflected from an area that is substantially larger than the area of the energy absorbing collector element, or tube. In other words, the radiant energy from the sun over a reasonably large area is concentrated on the smaller area of the collector. The solar collector of this invention is a passive concentrating solar collector.

The solar collecting art is highly developed so that most of the technical problems associated with solar collectors are known. Such problems include maximizing the amount of solar radiation concentrated on the collector element, minimizing the losses of energy from the collector element by convection and radiation where such back radiation is primarily in the infrared spectrum, and increasing the rate of flow of energy into the water in the collector element or, stated another way, minimizing the thermal impedance between that portion of the element that absorbs the solar energy and the water contained therein. The problem is now to optimize the solutions of these technical problems while minimizing the cost of manufacturing, of installation and of maintenance of such solar collectors.

PRIOR ART STATEMENT

The following references are submitted under the provisions of 37 CFR 1.97(b):

U.S. Pat. No. 1,880,938—Emmet
U.S. Pat. No. 4,011,855—Eshelman
U.S. Pat. No. 4,155,346—Aresty
French Pat. No. 1,165,672—Trombe Emmet, (U.S. Pat. No. 1,880,938), discloses a solar heating element which includes an evacuated glass container 1, a metallic mirror 2, a relatively small diameter boiler tube 3 which is substantially located at the focal point of mirror 2, and a concave metallic reflector 4 positioned above the boiler tube to reflect onto tube 3 light energy reflected by mirror 2 but which passes adjacent to tube 3.

Eshelman, (U.S. Pat. No. 4,011,855) teaches a solar collector with a light collecting member mounted within a light reflecting member. The light reflecting member has curved surfaces to cause substantially all light entering to be directed toward the light collecting member. The light collecting member can be an elongated circular member.

Aresty (U.S. Pat. No. 4,155,346) teaches a solar energy collector having collector tube assemblies which are comprised of an outer glass tube and an inner glass tube 18b with there being a gap or space between the tubes. Aresty teaches that the inner tube can be made of a metal having good thermal conductivity. Aresty also teaches incorporating a third tube which may be provided with a helical fin pattern to increase turbulence.

Trome (French Pat. No. 1,165,672) discloses various arrangements for concentrating incident solar radiation onto the cylindrical collector tube 9.

SUMMARY OF THE INVENTION

The present invention provides a passive concentrating solar collector for heating fluids, such as water, for domestic and industrial use. The collector has a frame which includes sides and a base. The upper edges of the sides substantially lie in a plane. The frame also has a longitudinal axis. Curved reflectors are positioned within the frame so that they are substantially symmetrical with respect to the longitudinal axis of the frame. The collector assembly of the invention is provided with a collector tube, a substantially clear conservator tube, and a pair of end caps which position the conservator tube so that it is substantially uniformly spaced from the collector tube. The collector tube is provided with an inlet at one end and an outlet at the other. The inlet is provided with a tube which is positioned in the inlet to direct water flowing into the collector tube toward the perimeter of the tube which imparts a radial component of velocity to the water in the tube. As a result, the flow of water tends to be helical and substantially along the perimeter of the tube. The collector assembly is mounted in the frame so that the longitudinal axis of the collector tube subtantially coincides with the longitudinal axis of the frame. The collector has a large diameter as a result of which it has a large storage capacity. Because of the large diameter of the collector tube, substantially all incident solar radiation reflected from the reflectors is directed to, or strikes, the collector and is absorbed by it and converted into heat. A curved dome of a material substantially transparent to the visible spectrum of solar energy is mounted on the frame and covers, or encloses, the collector assembly. The curved surface of the dome is substantially symmetrical to the longitudinal axis of the frame, and as a result radiation from the sun when the elevation of the sun above the horizon is relatively low, is refracted by the dome into the collector frame which increases the energy incident on the collector tube at low angles of elevation of the sun.

It is therefore an object of this invention to provide an improved solar collector, the cost of which to manufacture, to install and maintain, is minimized.

It is another object of this invention to provide an improved passive concentrating solar collector in which substantially all solar radiation incident on the reflector is focused on the collector tube.

It yet another object of this invention to provide a passive concentrating solar collector in which the storage capacity of the collector substantially eliminates the necessity of adding additional storage capacity for hot water which additional storage capacity is, in most applications, required of prior art solar collectors.

It is still another object of this invention to increase the thermal impedance between the collector tube and the ambient environment of the collector so that the collector can operate in colder climates with significantly reduced risk of freezing water in the collector tube.

It is a further object of this invention to provide a solar collector in which increased amounts of solar energy are directed to the collector tube at relatively small angles of elevation of the sun above the horizon.

BRIEF DESCRIPTION OF THE DRAWINGS

Other objects, features and advantages of the invention will be readily apparent from the following description of certain preferred embodiments thereof, taken in conjunction with the accompanying drawings, although variations and modifications may be affected without departing from the spirit and scope of the novel concepts of the disclosure, and in which:

FIG. 1 is a perspective view of a preferred embodiment of the solar collector of this invention;

FIG. 2 is a section taken on line 2—2 of FIG. 1;

FIG. 3 is a partial section taken on line 3—3 of FIG. 1;

FIG. 4 is a section of the collector assembly;

FIG. 5 is a section of the inlet end of the collector assembly at an enlarged scale;

FIG. 6 is a partial section showing details of how the reflector is mounted and positioned in the embodiment of FIG. 1;

FIG. 7 is a partial perspective of another embodiment of the invention; and

FIG. 8 is a side elevation of the embodiment of FIG. 7.

DETAILED DESCRIPTION OF THE INVENTION

In FIG. 1, solar collector 10 has a collector housing, or frame, 12 which includes lateral side walls 14, 15, end walls 16, 17, and a base, or bottom wall, 18. Walls 14–18 define the interior space, or volume, 19 of housing 12. Collector housing 12 is provided with brackets 20, 21 for removably mounting, or positioning, collector assembly 22 on, or in, housing 12. The center of opening 24 in bracket 20 and of opening 25 in bracket 21, which are illustrated in FIGS. 5 and 3, respectively, define the longitudinal axis 26 of frame 12. Collector assembly 22, as is best illustrated in FIGS. 4 and 6, comprises an inner collector tube 28 and an outer energy conserving tube, or conservator tube, 30. Tubes 28 and 30 are both hollow right circular cylinders of substantially equal length with the external diameter of collector tube 28 being less than the internal diameter of tube 30. The ends of tube 28 are closed to form a tank, or sealed container, by bases, or ends, 32, 33 which enclose, or define, the interior space 34 of collector tube 28. End caps 36, 37 position conservator tube 30 relative to collector tube 28 so that tube 30 is substantially concentric with tube 28, or the cylindrical axis of tube 30 substantially coincides with the cylindrical axis 38 of collector tube 28. The substantially uniform space, or gap, 40 between collector tube 28 and conservator tube 30 minimizes convective losses of heat from collector tube 28. Conservator tube 30 is made of a material that is substantially transparent to the visual spectrum of solar radiation but relatively opaque to infrared radiation so that radiant energy from the sun can pass directly through tube 30 to strike, or be absorbed by tube 28 with a minimum of reduction or loss in the intensity, but back radiation in the infrared spectrum from tube 28 is essentially stopped, or prevented. Tube 28 is made of a corrosion resistant material that has good thermal conductivity and is provided with a coating that absorbs substantially all incident solar radiation and converts such radiation to heat.

An inlet opening 40 is formed centrally in base 32 and an inlet fitting 42 is mounted in opening 40. A tube 44 is mounted in the side wall of fitting 42 with the end of fitting 42 located within tube 28 being closed, or sealed, so that water flowing into the interior space 34 of tube 28 will be directed radially toward the inner surface of tube 28, or the water flowing through inlet fitting 42 is provided with a radial component of velocity so that as water flows through tube 28 it will tend to follow a helical path as indicated by the arrowed line 46 in FIG. 4. A central outlet opening 48 is formed in base 33 in which is positioned outlet fitting 50 through which water flowing, or passing through, tube 28 exits space 34. Fitting 50 is provided with an opening 51 in the inner end of fitting 50 which is substantially symmetric to axis 38 of tube 28 and through which water from the interior of tube 28 flows as it is discharged therefrom. In addition, a pressure relief opening 52 is also provided in base 33 into which a pressure relief fitting 54 is mounted. A pressure relief valve is mounted in fitting 54 but such a valve is not illustrated since such valves are conventional. Collector assembly 22 is removably mounted in collector housing 12 by inserting the externally threaded ends of fittings 42, 50 through the openings 24, 25 in brackets 20 and 21. Assembly 22 is held in place by tightening nuts 56 which thread onto the threaded portions of fittings 42, 50 which extend through the brackets 20, 21. Details of the preferred manner of removably connecting fitting 42 to bracket 20 is illustrated in FIG. 5. Details of connecting outlet fitting 50 to bracket 21 at the outlet end of collector assembly 22 is substantially the same. It should be noted that bracket 21 is a vertical structural member while bracket 20 is an inverted V-shaped member made by welding two structural members together at the apex, for example. When collector assembly 22 is mounted in collector housing 12, the cylindrical axis 38 of assembly 22 substantially coincides with the longitudinal axis 26 of housing 12.

To increase the amount of solar energy concentrated on, and thus absorbed, by collector tube 28, a radiant solar energy reflector, or concentrator, 58 is mounted in housing 12 as is best illustrated in FIGS. 2 and 6. A rectangular sheet of solar radiation reflecting material 58 is mounted in collector housing 12 by means of projections 60 which are formed on the inner side of and near the upper edges 62 of side walls 14, 15, against which opposite sides of sheet 58 are placed. The central portion of sheet 58 contacts and is supported by the central portion 61 of base 18 which is shaped so that the light reflecting surface 64 of reflector 58 approximates that of a parabola. Reflector surface 64 of reflector 58 is positioned by projection 60 and central portion 61 of base 18 so that it is substantially symmetric with respect to axis 26 of collector housing 12. In the preferred embodiment, reflector 58 has a laminated plastic support layer 66 which includes a layer of fiberglass. The reflective surfce 64 is preferably a highly reflective metalized layer of mylar which is laminated onto the support layer 66.

Collector tube 28 has a large diameter for two primary reasons. One is to provide a large storage capacity for hot water and the other is to provide a large radiant energy absorbing area so that the shape of the reflector 58 is less critical, and thus the tolerances that must be held in the fabrication of collector 10 can be relaxed so that collector 10 can be manufactured at minimum cost. Because of the diameter of collector tube 28 and its position in collector housing 12, a substantial portion, approximately one-half, of collector assembly 22 extends, or projects, above the plane determined by or in which the upper edges 62 of walls 14–17 of collector housing 12 lie. This arrangement increases the amount of solar energy that will be absorbed by collector tube 28 at relatively low angles of elevation of the sun.

To protect reflecting surface 64 of reflector 58 from being deleteriously affected by the environment as well as the outer surfaces of tube 30 of assembly 22, collector 10 is provided with a protective cover or dome 68. Dome 68 is removably secured by conventional means such as by being bolted to flange 70 formed at the upper edges 62 of walls 14–17 of collector housing 12, as is best illustrated in FIG. 6. Dome 68 is made of a material that is substantially transparent to the visible spectrum of solar radiation and relatively opaque to infrared radiation. Dome 68 is curved so that when it is mounted on housing 12 it is substantially symmetric with respect to axis 26 of housing 12. A small gap, or space, exists between dome 68 and the nearest surface of tube 30 so that dome 68 provides additional thermal impedance, both convective and conductive, to heat flowing out of collector 28 to the ambient environment of collector 10. Dome 68, because of the extent to which it projects above housing 12 and because of the index of refraction of the material from which it is made, refracts solar radiation onto reflector 58 and collector tube 28 particularly when the angle of elevation of the sun above the horizon is relatively small which increases the efficiency of collector 10.

To minimize the amount of radiant energy being absorbed by, and thus the maximum temperature of, end walls 16, 17 of housing 12, substantially planar end reflectors 72, 73 are mounted between caps 36, 37 of assembly 22 and the end walls 16, 17 of housing 12. Energy reflected by the end reflectors 72, 73 has a high probability of being absorbed by collector 28 and thus of being converted to heat which increases the efficiency of collector 10. Bracket 20, which has an inverted V-shape as seen in FIG. 2, is connected in any appropriate manner, such as by bolting or welding, to structural member 74 which is positioned on the upper side of planar transverse section 75 of base 18. Bracket 21 is similarly connected to a similar structural member at the outlet end of housing 12, the difference being that bracket 21 is a vertical structural member.

To facilitate mounting collector 10 on a flat or sloping roof, a foot member 76 is positioned on the bottom side of sector 75 and is secured, as by bolting, to the structural member 74. The area of foot member 76 contacting a support surface, a roof for example, is sufficiently large so that the maximum load in terms of pounds per square foot applied is well below that required by most building codes.

In the embodiment of solar collector 80, illustrated in FIGS. 7 and 8, the collector assembly 22 is substantially the same as that of the embodiment of FIGS. 1–6 except that no pressure relief valve fitting is provided in base 33. The reason for eliminating a relief valve is that the temperatures and, thus the pressure, of water in collector tube 28 is not high enough normally to require a pressure relief valve to protect collector 80 from potential damage due to an over design limit pressure condition. Collector frame 82 is not provided with side walls, end walls or a base as is collector frame 12. Solar reflectors 84, 85 are made of, or are formed, from thin sheets of a suitable material uch as stainless steel which is provided with highly efficient solar energy reflecting surfaces 86, 87. Reflectors 84, 85 are free standing, i.e., need no special support and are formed so that the reflective surfaces 86, 87 form a concave curved surface that is substantially symmetric with respect to the longitudinal axis 88 of frame 82. Since reflectors 84, 85 are made of material that is substantially impervious to deleterious affects of the ambient environment, no protective housing is provided and no dome is required as provided in the embodiment illustrated in FIGS. 7 and 8. Collector assembly 22 is mounted on bracket 90 is substantially the same manner that collector assembly 22 is mounted on bracket 21 of collector housing 12. It should be noted that the collector assembly 22 extends, or projects, above the upper edges 90, 91 of reflectors 84, 85.

As illustrated in FIG. 8, frame 82 of collector 80 can be provided with a pair of extended legs 94, only one of which is seen in FIG. 8, which legs are pivotally connected at their apex and which apex substantially coincides with the longitudinal axis of frame 82. Legs 94 are selectively connected to a transverse member 96' of frame 82. This makes it possible to adjust the normally high, or outlet end, of collector assembly 22 relative to the normally lower inlet end. Structural member 96', which is not illustrated in FIG. 7, is substantially similar to structural membe 96 which is illustrated in FIG. 7 except that it is provided with a series of holes for positioning legs 94. The reflective elements 84, 85 are mounted onto longitudinal structural members 98 which extend between transverse structural members 96, 96'. Members 98 are substantially parallel to the longitudinal axis 88 of frame 82.

Solar collectors 10 and 80 are intended to be mounted on a substantially planar surfce such as a roof which can be either pitched or substantially flat. The collectors are preferably mounted so that longitudinal axes 26, 88 of frames 12 and 82, respectively, are substantially aligned with a meridian, with the inlet end preferably lower than the outlet end. Because of the large effective area of reflector 58, it is not critical that the housing 12 be tilted at an angle which is a function of the latitude of the location of the solar collector. With respect to the collector 80, because of the smaller area of collectors 84, 85, it is desirable that the longitudinal axis 88 be tilted at an angle that is a function of the latitude. This is accomplished by varying the angles determined by legs 94. Collectors 10 and 80 are secured to a suitable surface by mounting feet with which the frames of collectors 10, 80 are provided.

Housing 12 of collector 10 is preferably molded using a conventional plastic such as ABS. To provide the ABS with protection against radiation, a protective thin layer of a conventional radiation resistant plastic material is laminated over the exposed surfaces of housing 12. Dome 68 is preferably made of an acrylic polycarbonate such as DR Plex. Conservator tube 30 is preferably made of a polycarbonate such as Lexan. Collector tube 28, fittings 42, 50 and 54, end caps 36, 37, brackets 20, 21 and end reflectors 72, 73 are preferably made of stainless steel such as 3042 B. The reflective surface 64 of reflector 58 is preferably a metalized mylar preferably aluminum. Support layer 66 is a polycarbonate provided with a reinforcing fiberglass layer to provide additional desired physical properties.

In the preferred embodiment, tube 28 is approximately six feet long and nine inches in diameter which provides a storage capacity of substantially twenty gallons of water. The gap between the outer surface of tube 28 and the inner surface of tube 30 is approximately one inch. The effective width of reflector 58 is approximately forty-four inches.

Dome 68 and housing 12 are made of thermally resistive materials, i.e., they do not conduct heat well. Likewise, the material from which conservator tube 30 is made is not a good thermal conductor. Thus, housing 12 and dome 68, which enclose the collector assembly 22, tend to resist the flow of heat from collector tube 28 to the ambient environment. The size of the gap between conservator tube 30 and collector tube 28 significantly reduces convective losses from tube 28 as does the air space between collector assembly 22 and housing 12 and dome 68.

As pointed out above, the radiation transmission characteristics of dome 68 and conservator tube 30 resist, or are opaque, to back radiation. Thus, housing 12 and dome 68 tend to conserve the heat stored in the water in collector tube 28. Because of the mass of water in tube 28, approximately twenty gallons, there is a large amount of heat stored in the water in tube 28. This amount of heat, plus the thermal resistance of the enclosure of collector 10, reduces the heat loss from the water stored in collector 10. As a result, collector 10 can be utilized in significantly colder environments without the necessity of taking special precautions to prevent the water in the system from freezing. A particular advantage of the collector 10 is that the piping that connects inlet fitting 42 and the outlet fitting 50 to a hot water system of a house, for example, can be located in housing 12, and can be connected into the home through small openings in the base of the housing and the roof of the building to be provided with a solar heated hot water. This arrangement reduces loss of heat as well as preventing freezing of the piping in relatively cold climates.

From the foregoing, it is seen that this invention provides a solar collector that is relatively less costly to manufacture because the materials, particularly the reflectors, as well as the other components, do not have to be made with such a degree of precision that the cost of the manufacture is significantly increased. The materials used are resistant to corrosion so that collectors 10 and 80 could have long, useful lives with a minimum of maintenance. Because of the large storage capacity of collector assembly 22, no additional storage for hot water is required, and the storage capacity of collector assembly 22 prevents freezing in relatively cold climates.

It should be evident that various modifications can be made to the described embodiments without departing from the scope of the present invention.

We claim as our invention:

1. A Solar collector comprising:
    a collector frame having a longitudinal axis:
    reflective means forming a curved reflecting surface for reflecting solar radiation, said reflective means being mounted on the collector frame so that the reflecting surface is substantially symmetric with respect to the longitudinal axis of the frame;
    a collector assembly including a right circular cylindrical collector tube having an inner surface, said collector tube having a pair of ends and a longitudinal axis, said collector tube having inlet means and outlet means mounted in opposite ends thereof for introducing into and removing a liquid from the tube, said inlet means directing liquid flowing into the collector tube into a substantially helical path, a right circular cylindrical energy conservator tube made of material which is substantially transparent to the visible spectrum of solar radiation and having an internal diameter greater than the external diameter of the collector tube, and cap means for mounting the conservator tube so that it is substantially concentric with the collector tube; and
    means for mounting the collector assembly on the collector frame so that the longitudinal axis of the collector frame substantially coincides with the axis of the collector tube.

2. A solar collector as defined in claim 1 in which the collector frame is comprised of structural members.

3. A solar collector as defined in claim 2 in which the collector frame is further comprised of a molded plastic housing.

4. A solar collector as defined in claim 3 in which the reflective means is a substantially rectangular sheet of material having a reflective surface mounted in the molded plastic housing, the curvative of the surfaces of the reflective material being substantially determined by the housing.

5. A solar collector as defined in claim 2 in which the reflective means is made of formed sheets of metal.

6. A solar collector as defined in claim 1 in which the inlet means is mounted substantially on the longitudinal axis of the collector tube and includes conduit means for directing the liquid into a stream which initially is substantially perpendicular to the longitudinal axis of the collector tube.

7. A solar collector as defined in claim 6 in which the means for mounting the collector assembly includes brackets having a circular openings defining the longitudinal axis of the frame and into which fit the inlet means and the outlet means.

8. A solar collector comprising:
    a collector housing having lateral side walls, end walls, and a base, the walls each having an upper edge, said edges substantially lying in a plane, said collector housing also having a longitudinal axis;
    reflective means having a curved electromagnetic radiation reflecting surface mounted in said collector housing so that the reflecting surface of said reflecting means is substantially symmetrically positioned relative to the longitudinal axis of said collector housing;
    a collector assembly having a cylindrical collector tube having a substantial storage capacity, an inner surface, a pair of ends, an axis of symmetry and a diameter, said tube being made of an electromagnetic radiation absorbing material, said collector tube having inlet and outlet means positioned on said axis of symmetry at opposite ends thereof for circulating water through the collector tube, said inlet means substantially directing water flowing into the collector tube to follow a substantially helical path as the water flows toward the outlet means, a hollow cylindrical energy conservator tube made of a material substantially transparent to visible radiant energy, said conservator tube having an internal diameter greater than the external diameter of the collector tube, and cap means for mounting the conservator tube so that it is substantially concentric with the collector tube;
    means for mounting the collector assembly in the collector housing so that the axis of symmetry of the collector tube is substantially coincident with the longitudinal axis of the collector frame and with a substantial portion of the collector assembly projecting above the plane defined by the edges of walls of the collector housing; and a dome having a curved surface mounted on the collector housing and enclosing the collector assembly within the collector housing and the dome, the curved surfaces of the done being substantially symmetric with respect to the longitudinal axis of the collector frame.

9. A solar collector as defined in claim 8 in which the longitudinal axis of the housing substantially lies in said plane.

10. A solar collector as defined in claim 9 in which the walls and base of the housing are molded as an integral entity.

11. A solar collector as defined in claim 10 in which the reflective means includes a substantially rectangular sheet of support material with a thin layer of light reflecting material located on one side of the support material.

12. A solar collector as defined in claim 11 in which the storage capacity of the collector tube is substantially twenty gallons.

13. A solar collector as defined in claim 8 in which the inlet means is provided with an inlet tube substantially perpendicular to the axis of symmetry of the collector tube.

14. A solar collector as defined in claim 13 in which a pressure relief valve is mounted in the collector tube in proximity to the outlet means.

15. A solar collector as defined in claim 14 in which the means for mounting the collector assembly in the collector housing comprises brackets fabricated from structural members having openings formed in the brackets which define the longitudinal axis of the collector housing.

16. A collector assembly for a solar collector comprising:

a hollow right cylindrical collector tube having an axis of symmetry and a diameter, said tube having a substantial liquid holding capacity, and being made of stainless steel;

stainless steel inlet means for introducing a liquid into the tube and imparting a radial component of motion to the liquid so introduced, said inlet means being provided with a tube which is substantially perpendicular to the axis of symmetry of the collector tube;

stainless steel outlet means for removing from the collector tube liquid introduced into it by the inlet means, said inlet and outlet means being substantially symmetrical with respect to the axis of symmetry of the collector tube;

a hollow right cylindrical conservator tube made of a polycarbonate which is substantially transparent to visible radiant energy and having an internal diameter greater than that of the collector tube; and cap means for mounting the conservator tube so that the conservator tube is substantially concentric with the collector tube.

* * * * *